May 3, 1960 C. J. STEINKE 2,935,554

CHASSIS PEDESTAL

Filed June 25, 1958

INVENTOR
Carl J. Steinke
BY Francis W. Crotty
ATTORNEY 2,935,554
Patented May 3, 1960

2,935,554

CHASSIS PEDESTAL

Carl J. Steinke, Des Plaines, Ill., assignor to Zenith Radio Corporation, a corporation of Delaware Application June 25, 1958, Serial No. 744,561

2 Claims. (Cl. 174—158)

The present invention relates to sheet metal bases or chassis such as may be employed for the support of the electrical components of a television or radio apparatus and concerns itself more particularly with pedestals or brackets therefore by which such chassis are supported and secured within cabinet structures.

Chassis for radio and television apparatus are generally constructed of sheet metal with perpendicular wall sections. In order to make the installation of such chassis within cabinet structures more practical, some forms of brackets or pedestals are employed, the attachment of which has had to be made early in point of assembly line operations because of the nature of the installing operation. This was particularly true in the case of attachments that have had to be riveted or welded to the chassis on account of the attendant heat or vibration. The installation of such adjuncts following the completion of wiring and soldering is therefore hazardous to the previously installed circuitry.

In certain classes of radio and television apparatus it is advantageous to utilize the chassis as a common ground for the electrical system. In such cases, especially if the cabinet is made of metal, the pedestals are formed of insulating material and prevent accidental shock hazards to users who may touch the metal cabinet while being exposed to earth grounding.

It is accordingly a primary object of the present invention to provide an improved type of chassis and mounting pedestal for wave signal receivers which avoids the aforementioned limitations of prior structure.

It is another object of the invention to provide a pedestal attachment which may be installed in a sheet metal chassis with a minimum of physical effort and by the use of vibration-free non-heating hand tools.

In accordance with the present invention, there is provided a chassis frame fabricated of sheet metal and having at least one vertical wall. In such vertical wall there is provided a channelway having a predetermined length which is defined, in part, by a locking tab struck out of the wall and having a length less than that of the channelway. This locking tab is deflectable from one position in which the major portion of the channelway is unencumbered to a second position in which the tab effectively closes the channelway except for an end section thereof which possesses a predeterfined cross-sectional area. A mounting pedestal of insulating material is provided for the chassis. It has a planar surface for abuttingly engaging the vertical chassis wall and is provided with a locking projection that extends from its planar surface. This locking projection has an enlarged terminal portion together with a connecting portion whose cross section corresponds to that of the free end section of the channelway. The terminal portion of the locking projection is proportioned for insertion into the channelway while the locking tab is in its first position and is locked in place when the tab is in its second position, thus securing the pedestal to the wall. Another projection extends from the planar surface of the pedestal, parallel to the locking projection and spaced therefrom by a suitable amount to extend under and close to the edge of the chassis vertical wall.

The features of the present invention which are believed to be novel are set forth with particularity in the appended claims. The invention together with further objects and advantages thereof may best be understood by reference to the following description taken in conjunction with the accompanying drawing in several figures of which like reference numerals designate corresponding parts throughout, and in which:

Figures 1, 2, 3, 4:
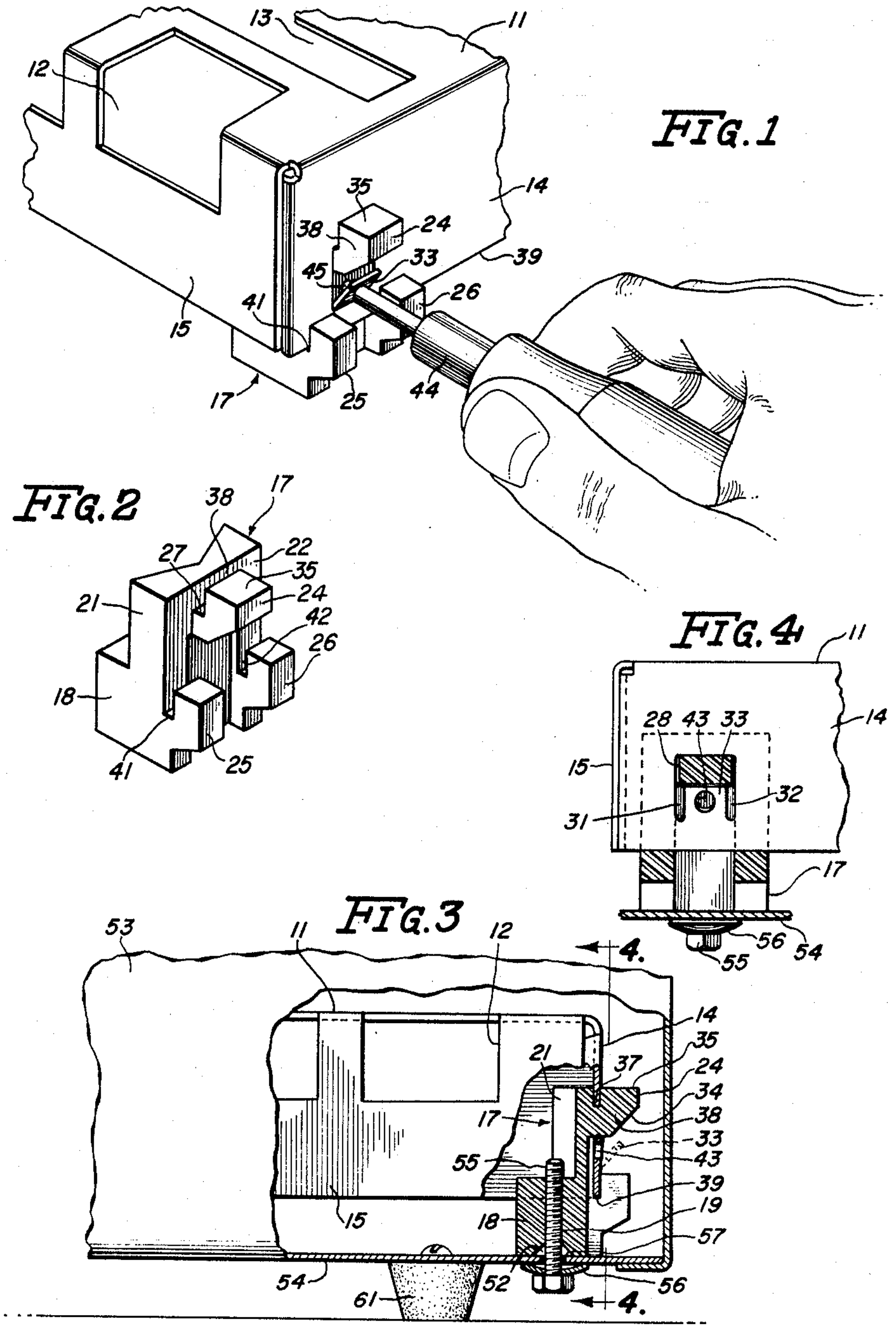
Figure 1 is a perspective view of a corner portion of a sheet metal chassis having a plastic pedestal attachment in position for securement and shown with a completion tool under manipulation.
Figure 2 is a perspective view of the mounting pedestal shown in Figure 1 and constructed in accordance with certain features of the present invention.
Figure 3 is a fragmentary side elevational view, with minor portions broken away, showing the apparatus of Figure 1 installed within an enclosing cabinet.
Figure 4 is a fragmentary sectional detail view taken on section line 4—4 of Figure 3.

Radio and television chassis are usually constructed of sheet metal to provide a principal table surface 11 in which variously shaped apertures 12 and 13 are formed by stamping and shearing to accommodate and cradle the electrical components. End panels 14 and 15 of such chassis are customarily bent at right angles to table surface 11 to constitute vertical wall portions and these are secured together at the corners by welding or riveting in order to achieve rigidity and beam strength.

At suitable corner locations, each of the four vertical walls of the chassis has a channelway 31 of a predetermined length defined, in part, by a locking tab 33 which is struck out of the wall. Each such tab, as appears clearly in Figures 3 and 4, has a length less than that of the channelway and is deflectable from one position in which the major portion of the channelway is free or unencumbered for the purpose of receiving a mounting pedestal projection, to a second position in which the tab effectively closes the channelway except for end section 28 thereof of predetermined cross-sectional area. The first-mentioned position of tab 33 is represented in broken-line construction in Figure 3 and its second position is shown in the same figure in full line. Locking tab 33 has a central aperture 43 which permits insertion of a tool 44 to facilitate displacing the tab from its struck-out position to its alternate position in which it is essentially coplanar with chassis wall 14.

An attachment device or mounting pedestal 17 constructed of molded plastic or other suitable insulating material is provided for insertion in each channelway. This pedestal has a base portion 18 which is provided with a vertically extending aperture 19, and an upstanding wall portion 21 presenting a planar surface 22 for abuttingly engaging wall 14 of the chassis. A principal projection 24 for locking pedestal 17 to chassis wall 14 extends perpendicularly from surface 22. This projection comprises a connecting portion 27 which has a cross sectional area corresponding to that of the free end section 28 of channelway 31 and an enlarged terminal portion 38 proportioned as to length and cross section so that it may be admitted into the channelway of wall 14 when locking tab 33 is in its deflected condition.

One or more additional projections 25 and 26 extend from planar surface 22 of pedestal 17, being disposed substantially parallel to locking projection 24 but spaced therefrom by such a distance as to extend abuttingly close to the bottom edge of the wall of the chassis. The space separation of these projections 25, 26 from locking projection 24 is selected to the end that when the pedestal is inserted into the chassis wall and then shifted bodily upward, in a manner to be described presently, the additional projection or projections shoulder against the wall edge 39.

The separation of the enlarged terminal portions of the three projections 24, 25 and 26 from planar surface 22 is preferably such as to define channels to snugly receive chassis wall 14 when pedestal 17 is assembled therewith.

In considering the installation of mounting pedestal 17 within the vertical wall of the chassis, it will be assumed initially that tab 33 is in its deflected position to free channelway 31 to receive locking projection 24. The pedestal is brought into position and terminal portion 38 of locking projection 24 is inserted into the channelway. This insertion is facilitated by the chamfered section 34 of the projection. As the projection is inserted, planar surface 22 is brought into abutting engagement with the interior surface of wall 14 whereon the pedestal is shifted vertically upwardly until the adjacent section 37 of the wall is received in the channel between projection 24 and planar surface 22. This completes a bayonet type locking connection between the pedestal and the wall and also clears the channelway to permit bending tab 33 to its alternate position in coplanar alignment with the wall. At the same time, the vertical displacement of pedestal 17 causes the free edge 39 of wall 14 to be received in the channels 41 and 42 formed by the spacing between the respective enlarged terminal portions of several pedestals 25, 26 and planar surface 22. At this time, locking tab 33 is engaged by means of a leverage tool 44 that has a reduced diameter extremity 45 suitable for entering aperture 43 of the tab. An upward prying movement of the tool restores the tab to the solid outlined position in which it is shown in Figure 3. The aforedescribed chamfered extremity 34 of projection 24 permits this locking operation to be executed in close quarters. By means of this exceedingly simple operation, mounting pedestal 17 is at once securely anchored in position without subjecting the chassis to the hazards of strain, heat or vibration incident to welding and riveting types of attachment.

Following the installation of one mounting pedestal 17 at each corner of the chassis, the chassis may be installed and secured within a cabinet in the manner illustrated in Figures 3 and 4. In the case of lightweight and portable television and radio apparatus, the cabinet 53 is often constructed of sheet metal and is usually provided with a floor or base panel 54 adapted to repose upon a series of mounting legs 61. Mounting holes 57 in floor panel 54 permit inserting mounting bolts into aperture 19 of each pedestal and the countersink 52 guides the bolt to the aperture. Preferably self-tapping bolts 55 and spring tensioning lock washers 56 are employed and the complete assembly may be quickly accomplished with speed wrenches.

The terminal portions of projections 24–26 of the mounting pedestals space the chassis from the side walls of the cabinet and, at the same, the lower projections 25, 26 space the chassis from the base of the enclosing cabinet. In this fashion, the chassis is effectively insulated from the cabinet and shock hazards, otherwise possible with the use of metal cabinets, are minimized.

By making the length of the free section 28 of channelway 31 slightly shorter than the vertical dimension of the connecting portion 27 of locking projection 24, a biting in or clamping effect may be attained during the restorative bending of locking tab 33 whereby the immobilization of the pedestals 17 is enhanced to an extent of excluding even minor vibrational looseness therebetween.

While a particular embodiment of this invention has been shown and described, it is apparent that various changes and modifications may be made thereto and it is therefore contemplated in the appended claims to cover all such changes and modifications as fall within the true spirit and scope of the invention.

I claim:

1. In combination: a chassis frame fabricated of sheet metal having at least one vertical wall; a channelway in said wall having a predetermined length and defined, in part, by a locking tab struck out of said wall, having a length less than that of said channelway and deflectable from one position in which the major portion of said channelway is unencumbered to a second position in which said tab effectively closes said channelway except for an end section thereof of predetermined cross-sectional area; and a pedestal of insulating material having a planar surface for abuttingly engaging said wall; a locking projection extending from said surface and having an enlarged terminal portion secured to said surface by a connecting portion of cross-section corresponding to that of said end section of said channelway, said terminal portion being proportioned for insertion to said channelway when said locking tab is in said first position and being locked in place, when said tab is in said second position to secure said pedestal in said wall; and another projection extending from said surface substantially parallel to said locking projection and spaced therefrom by such an amount to extend under and close to the edge of said wall.

2. In combination: a chassis frame fabricated of sheet metal having at least one vertical wall; a channelway in said wall having a predetermined length and defined, in part, by a locking tab struck out of said wall, said locking tab having a hole therein for facilitating its manipulation and possessing a length less than that of said channelway and deflectable by such manipulation from one position in which the major portion of said channelway is unencumbered to a second position in which said tab effectively closes said channelway except for an end section thereof of predetermined cross-sectional area; and a pedestal of insulating material having a planar surface for abuttingly engaging said wall; a locking projection extending from said surface having an enlarged terminal portion secured to said surface by a connecting portion of cross-section corresponding to that of said end section of said channelway, said terminal portion being proportioned for insertion to said channelway when said locking tab is in said first position and being locked in place when said tab is in said second position to secure said pedestal in said wall; and another similar locking projection extending substantially parallel to said locking projection, secured to said surface by a connecting portion and spaced from the first-mentioned locking projection by such an amount that the separation of the top surfaces of their connecting portions is substantially equal to the spacing of the top of said channelway from the edge of said wall.

References Cited in the file of this patent

UNITED STATES PATENTS

| | | |
|---|---|---|
| Re. 21,480 | Snow | June 4, 1940 |
| 2,443,449 | Fry | June 15, 1948 |

FOREIGN PATENTS

| | | |
|---|---|---|
| 670,163 | Great Britain | Apr. 16, 1952 |